United States Patent

[11] 3,588,540

[72] Inventor John Bohn
Montreal, Quebec, Canada
[21] Appl. No 884,513
[22] Filed Dec. 12, 1969
[45] Patented June 28, 1971
[73] Assignees Northern Electric Company Limited
Montreal, Quebec, Canada

[54] ADJUSTABLE RELAY
11 Claims, 4 Drawing Figs.

[52] U.S. Cl. .......... 307/251, 307/279, 307/293, 307/304
[51] Int. Cl. .......... H03k 17/60
[50] Field of Search .......... 307/251, 279, 304, 293; 317/140

[56] References Cited
UNITED STATES PATENTS

| | | | |
|---|---|---|---|
| 3,386,053 | 5/1968 | Priddy | 307/304X |
| 3,473,054 | 10/1969 | Wieczorek | 307/304X |
| 3,488,520 | 1/1970 | Hunter | 307/251 |
| 3,529,251 | 9/1970 | Edwards | 307/304X |
| 3,532,899 | 10/1970 | Huth et al. | 307/251 |

*Primary Examiner*—Stanley T. Krawczewicz
*Attorney*—Rogers, Bereskin and Parr

ABSTRACT: First and second metal insulator semiconductor field-effect transistors (MIS-FET's) have their sources connected together and to an input, and their drains connected to separate outputs, to constitute transfer contacts of a relay. The transistors are controlled by a pair of MIS-FET switches each having two inputs and an output. The first switch has one input connected to a control terminal and its output connected both to one input of the second switch and to the gate of the first transistor. The gate of the second transistor can be connected either to the control input (providing, e.g., early make-break operation) or to the output of the second switch (providing, e.g., early break-make operation). In the latter case the second switch output can also be connected to the second input of the first switch, providing latching operation, in which case the relay is reset by a reset voltage applied to the second input of the second switch.

INVENTOR.
JOHN BOHM

BY Rogers, Bereskin, & Parr

INVENTOR.
JOHN BOHM

BY Rogers, Bereskin, & Parr

ADJUSTABLE RELAY

This invention relates to an adjustable relay and constitutes an improvement to the electronic switch shown in my copending application Ser. No. 818,944 filed Apr. 24, 1969.

In many switching applications, for example in telephone exchanges, it has been common practice to use mechanical relays, which have the advantage that they provide a very low impedance between the input and the selected output, a virtually complete open circuit between the input and the nonselected output, and good isolation between the control current and the switched current. However, mechanical relays are expensive to construct, bulky in physical size, and very slow acting.

Accordingly, in the above-mentioned copending application there is disclosed an electronic switch employing metal oxide semiconductor field-effect transistors (MIS-FET'S). These are devices having an insulating layer between the gate and the switched region, and are presently becoming known generally as metal insulator semiconductor field-effect transistors (MIS-FET'S), the term "oxide" being reserved for the specific case where the insulating layer is an oxide. The insulating layer, which is commonly grounded, provides good isolation between the gate and the switched region.

The transistors disclosed in the above-mentioned copending application are arranged in a configuration that enables rapid switching between outputs, with good isolation between the input and the nonselected output, and with good isolation between the control input and both outputs. However, the circuit described in the said application contains no provision for latching the relay, or for providing early break-make (EBM) operation or early make-break (EMB) operation, all of which features are desirable in many applications.

Accordingly, the present invention provides an adjustable relay employing MIS-FET's and in one embodiment of which EBM or EMB operation can be achieved by a simple adjustment of wiring on the relay. In a preferred embodiment, latching operation can be achieved by a simple wiring adjustment.

In one of its aspects the adjustable relay according to the invention comprises:

a. first and second metal insulator semiconductor field-effect transistors each having a gate, a source and a drain, b. means connecting the sources of said transistors together and to a common input, and means connecting each drain to a separate output, c. first and second switch means each having first and second inputs and an output, and each having a first and second operating state depending on the signal received at their inputs, one input of said first switch means being a control input for receiving a control signal and the output of said first switch means being connected to the first input of said second switch means, d. means connecting said first and second switch means so that in the absence of said control signal, said first switch means is normally in its first operating state and the output of said first switch means then holds said second switch means in its second operating state, and when said control signal is applied to said control input, said first switch means changes to its second operating state and thereby causes said second switch means to change to its first operating state, e. means for connecting the gate of said first transistor to the output of said first switch means for the state of said first transistor to change when the state of said first switch means changes, f. and means for connecting the gate of said second transistor to a selected one of said control input and said output of said second switch means so that said second transistor will change state before said first transistor when the gate of said second transistor is connected to said control signal input and so that said second transistor will change state after said first transistor when said gate of said second transistor is connected to the output of said second switch means.

Further objects and advantages of the invention will appear from the following description, taken together will the accompanying drawings, wherein.

Figure 1:
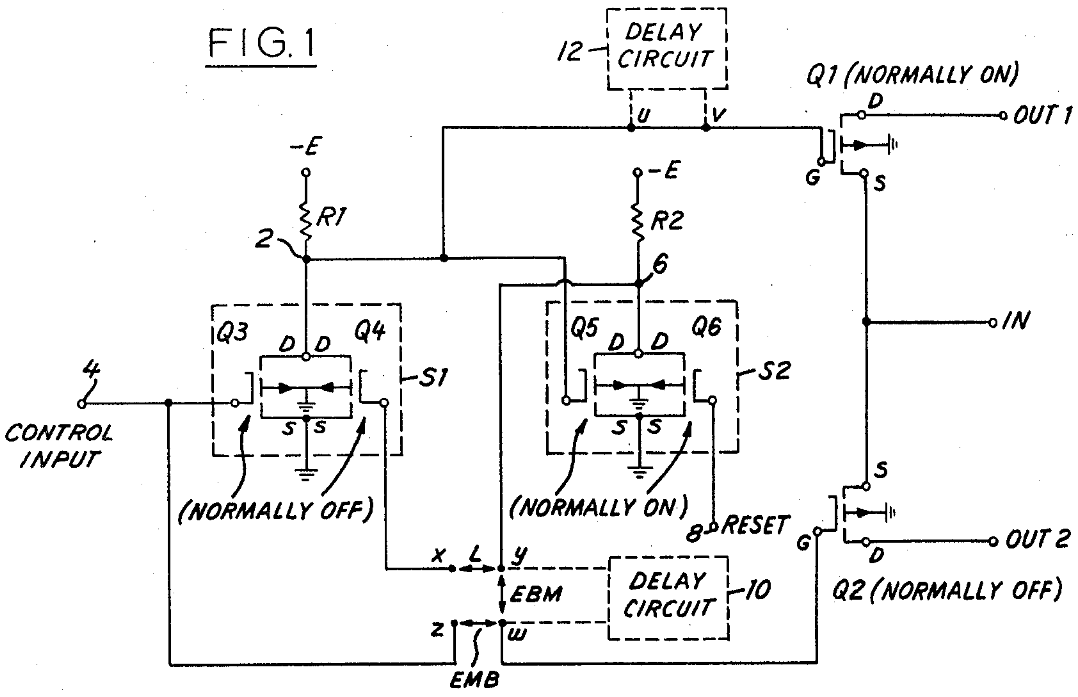
FIG. 1 is a circuit showing a relay according to the invention.

Reference is first made to FIG. 1 which shows the basic adjustable relay with a single pair of transfer contacts. In the FIG. 1 circuit, all transistors are shown as P-channel enhancement-type MIS-FET's, but N channel and depletion-type devices can be used as well, as will be discussed in more detail presently. Enhancement-depletion devices can also be used. The difference between the various types of devices is listed in the following table:

TABLE

| Channel maj. carriers | Mode of operation | Gate input voltage | Resistance between source and drain |
|---|---|---|---|
| N | Enhancement | + | Low. |
| | | Ground | High. |
| | | − | Do. |
| N | Depletion | + | Low. |
| | | Ground | Low. |
| | | − | High. |
| P | Enhancement | + | High. |
| | | Ground | Do. |
| | | − | Low. |
| P | Depletion | + | High. |
| | | Ground | Low. |
| | | − | Low. |
| N | Enh.-Depl. | + | Very low. |
| | | Ground | Low. |
| | | − | Very low. |
| P | Enh.-Depl. | + | Very high. |
| | | Ground | Low. |
| | | − | Very low. |

In the drawings, a solid or interrupted line in the channel indicates depletion and enhancement-type devices respectively, and an arrow towards or away from the channel indicates N or P conductivities respectively. The letters G, S, and D indicate gate, source, and drain respectively.

The FIG. 1 circuit includes a pair of P-channel enhancement-type MIS-FET's Q1, Q2 having their sources connected together and to an input IN, and having their drains connected respectively to output terminals OUTI and OUT2. When transistor Q1 is on and transistor Q2 is off, the input IN is connected to output OUT1 and is isolated from output OUT2, and when the state of transistors Q1 and Q2 is reversed, input IN is connected to output OUT2 and is disconnected from output OUT1. Transistors Q1 and Q2 thus represent the contacts of the relay.

The condition of transistors Q1 and Q2 is controlled by a pair of switches S1 and S2. Switch S1 consists of MIS-FET's Q3, Q4, and switch S2 consists of MIS-FET's Q5, Q6, all of these transistors being P-channel enchancement-type devices. Transistors Q3, Q4 have their sources connected together and to ground, and their drains connected together at node 2 and then through resistor R1 to an appropriate negative supply −E. The gate of transistor Q3 is connected to a control signal input terminal 4 which constitutes one input for the switch S1, and the gate of Q4 is connected to another terminal $x$ which thus constitutes a second input for the switch S1. The node 2 constitutes the output of switch S1.

Similarly, the sources of transistors Q5, Q6 are connected together and to ground, and their drains are connected together at node 6 and then through resistor R2 to the negative supply −E. The gate of transistor Q5, which represents one input to the switch S2, is connected to the output of switch S1 and node 2, while the gate of transistor Q6, which represents the other input to switch S2, is connected to a reset terminal 8. The node 6, which represents the output of switch S2, is connected to a terminal $y$.

In addition, the output 2 of switch S1 is connected through terminals *u*, *v* to the gate of transistor Q1, while the gate of transistor Q2 is connected to a terminal *w*. Finally, the control input terminal 4 is connected to a terminal *z* for a reason to be explained.

The operation of the device, either EMB of EBM (the EBM operation can be with latching if desired) can be selected by appropriate connection of terminals *x*, *y*, *w*, *z*. As will be explained, if terminals *w* and *z* are connected together, while terminals *x*, *y* and *y*, *w* are left unconnected, then EMB operation will result. Alternatively, if terminals *y*, *w* are connected together and terminals *z*, *w* and *x*, *y* are disconnected, then EBM operation will result, and if in addition to connecting terminals *y*, *w* together, terminals *y*, *x* are connected together, then EBM operation with latching will result.

Assume firstly that the switch is to operate in the EBM mode with latching, so that terminals *x*, *y* and *y*, *w* are connected together, and terminals *z*, *w* are not connected. Assume also that no control signal is being received at the control input terminal 4. In this condition, transistors Q3 and Q4 are off, so that the voltage at output node 2 is −E, and this voltage applied to the gate of transistor Q5 turns transistor Q5 on. The voltage at output node 6 of switch S2 is then close to ground, and the close to ground voltage applied through terminals *y*, *x* to the gate of transistor Q4 continues to hold transistor Q4 off.

At the same time, the voltage −E at output node 2 applied to the gate of transistor Q1 turns transistor Q1 on, and the approximately ground voltage present at output node 6 of switch S2 and applied through terminals *y*, *w* to the gate of transistor Q2 holds transistor Q2 off. Thus the input IN is connected to output OUT1 and is disconnected from output OUT2.

Assume now that a negative input control voltage is applied to control input terminal 4. This turns transistor Q3 on, causing the voltage at output node 2 of switch S1 to fall nearly to ground, thus turning off transistor Q5. The voltage at output node 6 of switch S2 then falls to −E and, through terminals *y*, *x*, turns transistor Q4 on. This results in latching of the switches S1, S2 in their changed state, since even if the control signal at input terminal 4 is removed, transistor Q4 will remain on and will hold transistor Q5 off.

In addition, when the output voltage at node 2 of switch S1 falls approximately to ground, this turns off transistor Q1. Further, when the output voltage at node 6 of switch S2 falls to −E, this turns transistor Q2 on. The result is that the input In is now connected to output OUT2 and is disconnected from output OUT1, so that in effect the contacts of the relay have transferred. Further, the operation has been early break-make, since transistor Q1 turned off as soon as the operating condition of switch S1 changed, while transistor Q2 did not turn on until the operating condition of switch S2 changed.

To reset the device, a reset voltage (−E) is applied to reset terminal 8 to turn on transistor Q6. The voltage at output node 6 of switch S2 then rises nearly to ground, turning off transistors Q2 and Q4, and with transistor Q3 off, the voltage at node 2 of switch S1 falls to −E turning on transistor Q1 (i.e. transferring the contacts of the relay) and also turning on transistor Q5 to that the device will remain in its home state until the control signal is again applied at input terminal 4.

For EMB operation, terminals *z*, *w* are connected and the connections between terminals *x*, *y* and *y*, *w* are removed. In this situation, when a control signal of magnitude −E is applied to control input 4, the transistor Q2 is immediately turned on, but transitor Q1 does not turn off until after the operating condition of switch S1 has changed, resulting in early make-break operation. Since the control signal is required to hold transistor Q2 on, there can be no latching in this mode of operation, and the transistors Q4, Q6 play no part in the operation.

While the choice of EMB or EBM operation can be made simply by making the appropriate connections between terminals *x*, *y*, *z*, *w*, the delay between break and make in EBM operation or the overlap period in EMB operation depends on the circuit components and is normally fixed. If EBM operation is desired but with a longer delay than that available from the circuit itself, then an external delay circuit 10 (shown in dotted lines) can be connected between terminals *y*, *w* in place of the short circuit between these terminals. This can increase the delay between make and break to any value determined primarily by the delay circuit 10. The delay circuit can be of any desired construction, but an integrated MOS circuit consisting of a series of flip-flops will constitute the most compatible arrangement. The delay circuit 10 can be used in both latching and nonlatching EBM operation.

Similarly, adjustment of the overlap in EMB operation can be achieved by inserting an external delay circuit 12 (shown in dotted lines in FIG. 1) between terminals *u*, *v* in place of the short circuit. This will delay the shutting off or break operation of transistor Q1 by approximately the delay of the external circuit 12.

Figure 2:
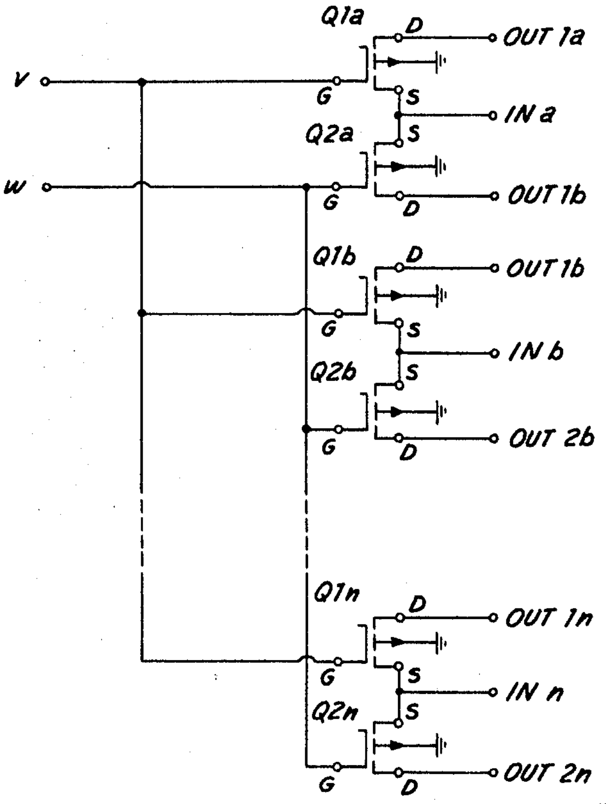
FIG. 2 shows a portion of the FIG. 1 circuit modified for switching of additional contacts.

FIG. 1 shows only one pair of transfer contacts, but as discussed in the previously mentioned copending application and as shown in FIG. 2, more than one set of transfer contacts can be provided. In FIG. 2, *n* transfer contacts are provided, constituted by a first input IN*a* connected through transistors Q1*a*, Q1*b* to output OUT1*a*, OUT2*a*; a second input IN*b* connected through transistors Q1*b*, Q2*b* to outputs OUT1*b*, OUT2*b*; up to an input IN*n* connected through transistors Q1*n*, Q2*n* to outputs OUT1*n*, OUT2*n*. The gates of transistors Q1*a*, Q1*b*...Q1*n* are connected to terminal *v* and hence to the output of switch S1, while the gates of transistors Q2*a*, Q2*b*,....Q2*n* are connected together and to terminal *v* and hence either to the control input 4 or the the output node 6 of switch S2, depending on the mode of operation desired. The operation of the FIG. 2 circuit is thus identical with that of the FIG. 1 circuit except that several sets of contacts instead of merely one set are switched upon change of state of the switches S1, S2.

Figure 3:
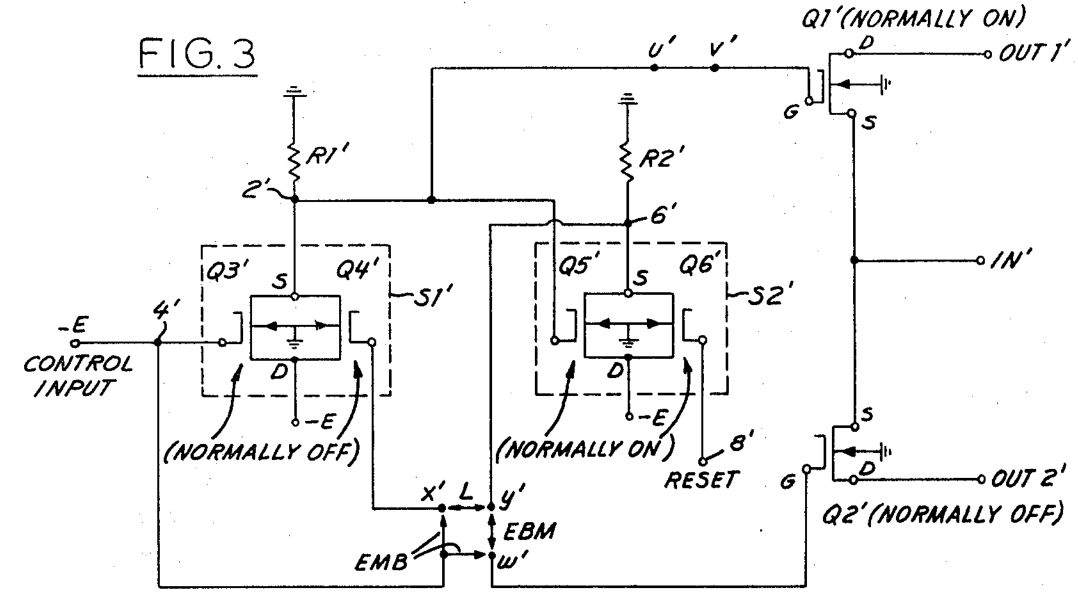
FIG. 3 is a circuit similar to the FIG. 1 circuit but employing depletion instead of enhancement-type devices.

Reference is next made to FIG. 3 which shows a circuit essentially the same as that of FIG. 1, but with the delay circuits 10, 12 omitted for simplicity and with transistors Q1 to Q6 constituted by N-channel depletion-type devices instead of P-channel enhancement-type devices. In FIG. 3, primed reference numerals indicate parts corresponding to those of FIG. 1.

As can be seen the FIG. 3 circuit arrangement is the same as that of FIG. 1 except that the supply voltage −E of FIG. 1 has been changed to ground, and the ground of FIG. 1 has been changed to −E. In addition the labelling of the sources and drains of transistors Q3′ to Q6′ has been interchanged because of the changed current direction. Further, in order to maintain transistor Q3′ normally off, a negative voltage −E is normally applied at input terminal 4′ and removal of voltage −E at terminal 4′ constitutes application of a control signal.

Under these conditions, with voltage −E applied to terminal 4′, the situation is similar to that of FIG. 1. Transistor Q3′ is off, thus holding transistors Q1′ and Q5′ on, and (assuming latching ad EBM operation), the negative voltage at terminal 6′ then hold transistor Q4′ off and also holds transistor Q2′ off. When voltage −E is removed from terminal 4′, then transistor Q3′ turns on, turning transistors Q1′ and Q5′ off and thus latching transistors Q2′ and Q4′ on, exactly as in the operation of the FIG. 1 circuit.

For EMB operation without latching, terminals *x*′, *y*′, w′ are disconnected, and terminals *z*′, *w*′ are connected, as in the FIG. 1 circuit. In addition, terminals *x*′, *z*′ are connected, so that transistor Q4′ will remain off until a control signal is applied to terminal 4′ to turn transistors Q3′, Q4 ′ and Q2′ on, and hence to turn transistor Q1′ off.

Figure 4:
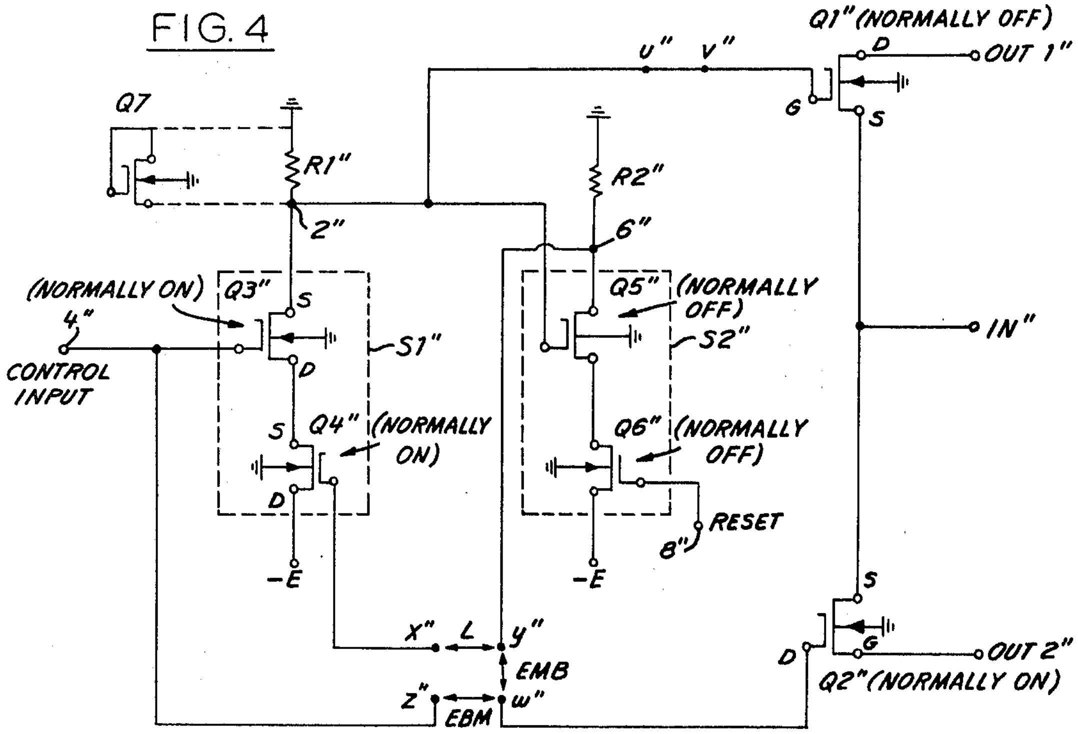
FIG. 4 shows a modification of the FIG. 3 circuit.

If desired, the FIG. 3 circuit can be modified as shown in FIG. 4, where double-primed reference numerals indicated parts corresponding to those of FIGS. 1 and 3. The FIG. 4 circuit uses N-channel depletion-type devices as of the FIG. 3 circuit, and differs from the FIG. 3 circuit only in that transistor Q4″ is now connected in series with transistor Q3″ instead of in parallel with it; transistor Q6″ is in series with transistor Q5″ instead of being in parallel with it; and under quiescent conditions, no voltage (or alternatively, ground potential) is applied to control input terminal 4″. In addition, when the power to the FIG. 4 circuit is turned on, a brief pulse of negative voltage –E must be applied to the reset terminal 8″ to place the circuit in its proper operating condition; such a brief pulse can be achieved by an conventional means, such as a capacitor connected between the negative supply and terminal 8″, with a bleeding resistor connected between ground and each side of the capacitor.

Under these conditions, when the FIG. 4 circuit is turned on, transistor Q3″is one (due to lack of negative bias at its gate), while transistor Q6″is off (due to the negative pulse applied to the reset terminal). Assuming that latching operation is desired, terminals *x*″, *y*″ are connected, and terminals *y*″, *w*″ are also connected. Since transistor Q6″ is off, ground potential appears at node 6″and turns transitor Q4″ on, and the potential at node 2″ then falls nearly to –E and holds transistor Q5″ off even after the negative pulse at the reset terminal 8″ has ended. In addition the close to –E potential at node 2″holds transistor Q1″ off, while the ground potential at terminal 6″ holds transistor Q″ on, so that the input IN″ is connected to the output OUT2″.

If a negative input control pulse appears at control input terminal 4″, this turns off transistor Q3″, and the potential at node 2″ rises to turn on transistors Q1″ and Q5″. Since transistor Q6″ is in its low-impedance state (since there is no negative potential presently at reset terminal 8″), the potential at node 6″ falls to nearly –E to turn off transistor Q2″, thus transferring the input, and also turning off transistor Q4″ to latch the circuit in this state until a rest pulse is applied to reset terminal 8″. Since transistor Q1″ turns on before transistor Q2″ turns off, the result is EMB operation with latching.

For EBM operation, terminals *x*″, *y*″ and *y*″, *w*″ are disconnected and instead terminals *z*″, *w*″ are connected together. In this situation, after the power has been turned on (with a negative pulse applied to terminal 8″), transistor Q1″ is off and transistor Q2″ is on as before, so that the input is connected to output OUT2″, as before. When a negative pulse is applied to terminal 4″, transistor Q2″ is turned off immediately but transistor Q1″ is not turned on until after transistor Q3″ turns off, resulting in EBM operation.

It will be noted that the FIG. 4 circuit, which gives EMB operation with latching or EBM operation without latching, can be obtained from the FIG. 3 circuit (which gives EBM operation with latching or EMB operation without latching) simply by changing the input conditions at the control and rest terminals and by connecting transistors Q3′, Q4′ in series and transistors Q5′, Q6′ in series. These series instead of parallel connections can be achieved simply by brining the sources and drains of transistors Q3″ to Q6″ out to terminals so that the appropriate wiring connections can be made on the completed device, depending on the mode of operation desired.

Although conventional resistors R1, R2 have been shown in the circuits described, ti will be realized that the resistors can be replaced by MIS-FET's of appropriate channel resistance so that the necessary potentials to turn the switches S1 and S2 on and off will be achieved. Such an arrangement is illustrated in FIG. 4, where transistor Q7 is illustrated in dotted lines as being connected in place of resistor R1″.

Although transistor Q3, Q4 and Q5, Q6 have been shown in the drawings as independent MIS-FET's, each pair can if desired be replaced by a double channel but common source and rain device or by a single channel but double gate structure in the FIG. 4 circuit. Although different types of MIS-FET's can be used, it is preferred that all of the MIS-FET's shown in each relay be of the same mode of operation (enchancement or depletion or enhancement-depletion) and the same conductivity (N-channel or P-channel), so that the entire relay can easily be fabricated in integrated circuit from on a single chip.

I claim:

1. An adjustable relay comprising:

a. first and second metal insulator semiconductor field-effect transistors each having a gate, a source and a drain, b. means connecting the sources of said transistor together and to a common input, and means connecting each drain to a separate output, c. first and second switch means each having first and second inputs and an output, and each having a first and a second operating state depending on the signal received at their inputs, one input of said first switch means being a control input for receiving a control signal and the output of said first switch means being connected to the first input of said second switch means, d. means connecting said first and second switch means so that in the absence of said control signal, said first switch means is normally in its first operating state and the output of said first switch means then holds said second switch means in its second operating state, and when said control signal is applied to said control input, said first switch means changes to its second operating state and thereby causes said second switch means to change to its first operating state, e. means for connecting the gate of said first transistor to the output of said first switch means for the state of said first transistor to change when the state of said first switch means changes, f. and means for connecting the gate of said second transistor to a selected one of said control input and said output of said second switch means, so that said second transistor will change state before said first transistor when the gate of said second transistor is connected to said control signal input and so that said second transistor will change stage after said first transistor when said gate of said second transistor is connected to the output of said second switch means.

2. A relay according to claim 1 including means for additionally connecting said output of said second switch means to said second input of said first switch means so that when said second switch means changes to its first operating state consequent upon said first switch means changing to its second operating state, the output of said second switch means will latch said first switch means in its second operating state, and means for applying a reset signal to said second input of said second switch means to change said second switch means back to its second operating state thereby to change the state of said first switch means to its first operating state.

3. A relay according to claim 2 wherein said first and second switch means each comprise metal insulator semiconductor field-effect transistor means having two gates, a source, and a drain, said inputs for each switch means being said gates, and said output for each switch means being one of said source and said drain.

4. A relay according to claim 3 wherein said metal insulator semiconductor field-effect transistor means and said first and second transistor are all of the same conductivity type and of the same mode of operation.

5. A relay according to claim 1 including delay circuit means and means for connecting said delay circuit means between said output of said first switch means and the gate of said first transistor.

6. A relay according to claim 1 including delay circuit means, and means for connecting said delay circuit means between said output of said second switch means and said gate of said second transistor.

7. A relay according to claim 3 where each metal insulator semiconductor field effect transistor means comprises a pair of channels, said channels having their sources connected together and their drains connected together, one said gate being associated with each channel, said first operating condition being a condition in which both said channels are biased to high impedance by said gates and said second operating conditions being a condition in which at least one of said channels is biased to low impedance by its gate.

8. A relay according to claim 3 wherein each metal insulator semiconductor field-effect transistor means comprises a single channel with both said gates associated with said channel, whereby either of said gates can bias said channel to high impedance, and said first operating condition is a condition in which said channel is biased to low impedance, by said gates and said second gating operating condition is a condition in which said channel is biased to high impedance by at least one of said gates.

9. A n adjustable relay comprising:

a. first and second metal insulator semiconductor field-effect transistors each having a gate, a source and a drain, b. means connecting the sources of said transistors together to a common input, and means connecting each drain to a separate output, c. first and second switch means each having first and second inputs and outputs, and each having a first and second operating state depending on the signal received at their inputs, one input of said first switch means being a control input for receiving a control switch and the output of said first switch means being connected to the first input of said second switch means, d. means connecting said first and second switch means so that in the absence of said control signal, said first switch means is normally in its first operating state and the output of said first switch means then holds said second switch means in its second operating state, and when said control signal is applied to said control input, said first switch means changes to its second operating state and thereby causes said second switch means to change to its first operating state, e. means for connecting the gate of said first transistor to the output of said first switch means for the state of said first transistor to change when the state of said first switch means changes, f. means for connecting the gate of said second transistor to said output of said second switch means so that said second transistor will change state upon change of state of said second switch means and will thus change its state after said first transistor changes state, and g. and means for connecting said output of said second switch means to said input of said first switch means so that when said second switch means changes to its first operating state consequent upon said first switch means changing to its second operating state, the output of said second switch means will latch said first switch means in its second operating state, and means for applying a reset signal to said second input of said second switch means to change said second switch means back to its second operating state thereby to change the state of said first switch means to its first operating state.

10. A relay according to claim 9 wherein said first and second switch means each comprise metal insulator semiconductor field-effect transistor means having two gates, a source, and a drain, said inputs for each switch means being said gate, and said output for each switch means being one of said source and said drain.

11. A relay according to claim 10 wherein said metal insulator semiconductor field-effect transistor means and said first and second transistors are all of the same conductivity type and of the same mode of operation.